W. E. PHINNEY & S. O. LARRABEE.
ARTIFICIAL BAIT.
APPLICATION FILED JULY 18, 1916.
1,239,957. Patented Sept. 11, 1917.
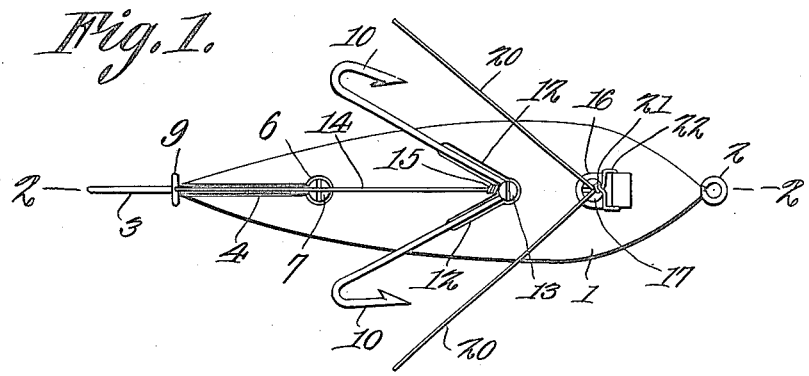
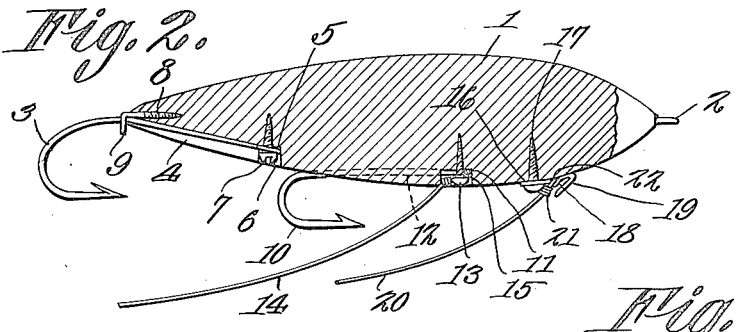
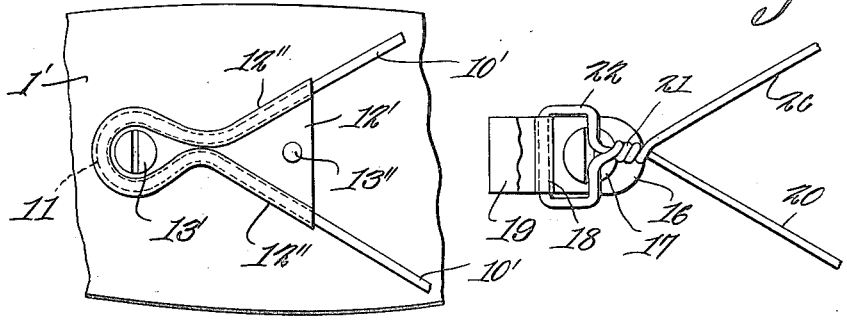
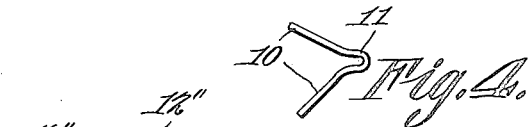
W. E. Phinney and S. O. Larrabee, Inventors
Witnesses
by Attorneys

UNITED STATES PATENT OFFICE.

WILLIS E. PHINNEY AND SAMUEL O. LARRABEE, OF COLDWATER, MICHIGAN.

ARTIFICIAL BAIT.

1,239,957.　　　　　Specification of Letters Patent.　　Patented Sept. 11, 1917.

Application filed July 18, 1916. Serial No. 109,931.

*To all whom it may concern:*

Be it known that we, WILLIS E. PHINNEY and SAMUEL O. LARRABEE, citizens of the United States, residing at Coldwater, in the county of Branch, State of Michigan, have invented a new and useful Artificial Bait, of which the following is a specification.

The present invention appertains to artificial fishing bait, and aims to provide a bait of novel and improved construction to enhance the utility and efficiency thereof.

One of the objects of the invention is the provision of novel means for attaching the hooks to the bait body.

Another object of the present invention is the provision of weed guards for the hooks, and novel means for attaching said guards to the bait body.

It is also the object of the invention to provide an artificial bait having the features above noted, and which at the same time is exceedingly simple in construction, inexpensive to manufacture, and thoroughly practical and efficacious in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a bottom view of the improved bait.

Fig. 2 is a longitudinal section taken on the line 2—2 of Fig. 1, portions being shown in elevation.

Fig. 3 is an enlarged bottom view of the means for attaching one weed guard to the bait body.

Fig. 4 is a detail view of the crotch portion of the double hook.

Fig. 5 is a fragmental bottom view of another bait illustrating a modified means for attaching the double hook to the body.

Fig. 6 is a perspective view of the attaching plate shown in Fig. 5.

The bait body 1 is of fusiform or other suitable contour, as usual, and is composed of wood or other buoyant material, the surface of the body being suitably finished in order to simulate a live bait. The body 1 is provided at its forward end or nose with a line attaching eye 2, whereby the bait can be cast and drawn through the water as usual.

One of the features of the invention is the provision of special means for attaching the tail hook 3 to the rear end of the body. To accomplish this, the body 1 is provided with a lower longitudinal slot or groove 4 extending from its rear end forwardly for a short distance, and provided at its forward end with an enlargement or recess 5. The shank of the tail hook 3 is seated in the slot 4, with the bill of the hook depending and projecting forwardly, as seen in Fig. 2, and the eye 5 of the hook seats within the recess 6 and is clamped therein by means of a screw 7 or other retaining element engaged through the eye 5 and taking into the body 1 in an upward direction. A screw 8 is threaded into the rear end of the bait, and is provided with a depending eye 9 extending at right angles from the shank of said screw whereby said eye has its axis arranged longitudinally of the bait, and said eye embraces and rigidly holds the shank of the hook at the rear end of the slot 4. The screws 8 and 7 therefore firmly secure the tail hook to the rear portion of the bait without any objectionable protuberances upon the bait body. The bill of the hook 3 projects rearwardly from the slot 4 and rear end of the body 1 and hangs downwardly to snag a fish attempting to bite or swallow the bait.

Another salient feature of the invention is the provision of a double hook and means for attaching it to the under surface of the body between the ends thereof. The double hook embodies the rearwardly diverging hooks 10 having their shanks united by a crotch portion 11 of U- or loop-shape. The bills of the hooks are at the remote ends of the diverging shanks and hang downwardly, the same as the bill of the hook 3. The body 1 is provided in its lower surface between its ends with rearwardly diverging slots or grooves 12, or the same can be denominated a V-shaped slot with the limbs thereof diverging rearwardly. The adjacent portions of the shanks of the double hook are seated upwardly in the slots 12, and the crotch portion 11 of the double hook seats within the crotch portion of the slots 12, and the crotch portion 11 is clamped to the body by means of a screw 13 or other retaining element engaged upwardly through the crotch portion 11 and taking into the body 1. The double hook is thus fastened rigidly to the under surface of the body, and the shanks in seating within the slots 12, will prevent the displacement of the double hook. The bills of the double hook project rearwardly from the sides of the bait, and in connection with the tail hook 3 provide admirable means for snagging or catching the fish which attempts to bite or swallow the bait. The provision of the rigid hooks is superior to the use of dangling or loosely hung hooks which are more apt to become entangled in weeds, and which are also apt to be swung out of the way by the fish in its attempt to bite the bait. It is to be noted that the shank of each hook is seated for the greater portion of its length against the intermediate wall of the respective groove between the side walls of said groove or slot, whereby to hold the hook in place rigidly at the surface of the bait.

Instead of the hooks 10 being united, two single hooks can be provided with their shanks seated in the slots 12 and with their eyes both engaged by the screw 13. The shanks of both the tail and double hooks are let into the body by the provision of the slots, which is a desirable characteristic of the invention.

Weed guards are provided for the tail and double hooks, to deflect weeds from said hooks. The weed guard 14 for the tail hook 3 is formed from fine resilient wire, and has one end bent into an eye, loop or the like, as at 15, to engage the shank of the screw 13, whereby said end of the weed guard will be secured to the under surface of the body by the same securing element which fastens the double hook thereto. The weed guard 14 is slightly curved, and projects downwardly and rearwardly, as seen in Fig. 1, so that the free end of the guard 14 is below the point of the hook 3. The guard 14 will deflect weeds away from the hook 3, and the free terminal of the guard 14 can be readily flexed in various directions, such as when a fish attacks the bait.

A double weed guard is provided for the double hook, and is also formed from fine resilient wire, being composed of the diverging guards 20 projecting downwardly and rearwardly and constituting the terminals of the wire. The wire is twisted, as at 21, to connect the adjacent ends of the guards 20, and to provide a rectangular loop or eye 22 for pivotally connecting the double guard with the body. The double guard is connected to the lower surface of the body slightly in advance of the double hook, by means of a small plate or attaching member 16 clamped to the lower surface of the body by means of a screw 17 or other securing element extending upwardly through the member 16 and taking into the body. The member 16 projects forwardly from the screw 17 and is provided immediately in front of said screw with a transverse down struck crimp 18 providing a bearing through which the loop 22 extends, whereby the loop 22 is held against the body by said crimp or bearing 18, which also pivotally connects the double guard with the body, thereby providing for the swinging movement of the guard in a longitudinal vertical plane about a transverse axis. The forward end of the member 21 is bent back downwardly, so as to project downwardly and rearwardly, to provide a stop 19 against which the twisted portion or shank 21 of the double guard is adapted to bear when the double guard is swung forwardly. This limits the forward movement of the double guard to prevent it becoming entangled with the line, although the double guard can swing forwardly away from the double hook, thus permitting the double guard to fly forwardly when a fish is in the act of biting or swallowing the bait. The weed guards 20 are resilient and are curved slightly, the same diverging rearwardly and having their free ends below the points of the hooks 10 to deflect weeds away from the double hook. The twisted portion or shank 21 of the double guard in contacting with the head of the screw 17 limits the rearward movement of the double guard, to prevent the guards 20 from moving too close to the hooks 10, so that it will be evident that the twisted portion or shank 21 in being movable between the screw 17 and stop 19 will limit the rearwardly and forwardly swinging movements of the double guard. The double guard is readily attached to the bait body by means of the member 16, and when said member is removed, the double guard is readily removed from the body.

Figs. 5 and 6 illustrate modified means for attaching the double hook to the body 1'. The adjacent ends of the diverging shanks 10' of the double hook are connected by a loop 11', and an attaching plate 12' is used for clamping and holding the double hook against the under surface of the body with the shanks 10' diverging rearwardly. This plate 12' rests against the under surface of the body and is provided with a groove 12'' having diverging portions connected by a loop to accommodate and receive the adjacent portions of the shanks 10' and the loop 11'. A screw 13' or other securing element is engaged through the plate 12' within the loop of its groove and takes into the body 1, the same as the screw 13 above described, and the rear end of the plate is secured to the body by means of a brad, tack or other securing element 13'' between the remote or diverging ends of the groove of said plate. With this form, the body 1' is not grooved for the double hook. In each form of the invention, there is provided in connection with the bait body, securing means upon the under surface thereof, and a double hook held or clamped between the securing means and body, one of the first mentioned elements having a groove or slot receiving the double hook to steady it.

Having thus described the invention, what is claimed as new is:

1. An artificial bait having a body, a tail hook having its shank seated for a portion of its length against the body, and a screw threaded into the rear end of the body and having an eye extending at an angle therefrom and embracing said shank.

2. An artificial bait having a body, securing means carried thereby at one surface thereof, and a double hook having its crotch portion held between said securing means and body, one of the first mentioned elements having a groove receiving the crotch portion of the double hook, the shanks of the double hook seating against the intermediate wall of said groove.

3. An artificial bait having a body, and a double hook having rearwardly diverging shanks connected by a crotch portion, said crotch portion being secured to the under surface of the body between its ends, and said shanks having downwardly projecting bills projecting from the opposite sides of the body.

4. An artificial bait having a body, a tail hook having its shank secured to the body and having its bill projecting rearwardly and downwardly from the rear end of the body, a double hook having rearwardly diverging shanks and a crotch portion connecting said shanks, means securing said crotch portion to the under surface of the body between its ends, and a weed guard for the tail hook held by said securing means and projecting rearwardly and downwardly with its free end below the tail hook.

5. An artificial bait having a body, a hook carried by said body, an attaching member carried by the body in advance of the hook and having a crimp and a stop, and a weed guard having a loop engaging said crimp to pivotally connect the weed guard with the body for swinging movement toward and away from the hook, said stop limiting the movement of the weed guard.

6. An artificial bait having a body, a double hook secured thereto and having rearwardly diverging shanks, an attaching member resting against the body in advance of the double hook, a securing element fastening said member to the body, said member having a crimp in advance of said securing element and a stop in advance of said crimp, and a double guard formed of wire having rearwardly diverging terminals projecting below the points of the double hook, a twisted portion at the adjacent ends of said terminals, and a loop adjacent the twisted portion engaging said crimp, said twisted portion being limited in its movement by said securing element and stop.

In testimony that we claim the foregoing as our own, we have hereto affixed our signatures in the presence of two witnesses.

WILLIS E. PHINNEY.
SAMUEL O. LARRABEE.

Witnesses:
ARLINE M. CHANDLER,
LILIAN STRAW.